US012651549B2

(12) United States Patent
Kim et al.

(10) Patent No.: US 12,651,549 B2
(45) Date of Patent: *Jun. 9, 2026

(54) DISPLAY APPARATUS AND METHOD OF DRIVING DISPLAY PANEL USING THE SAME

(71) Applicant: Samsung Display Co., Ltd., Yongin-si (KR)

(72) Inventors: Jae Shin Kim, Seoul (KR); Inbok Song, Hwaseong-si (KR); Sung-Yeol Baek, Anyang-si (KR); Kyungsu Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,988

(22) Filed: Dec. 30, 2024

(65) Prior Publication Data

US 2025/0131865 A1 Apr. 24, 2025

Related U.S. Application Data

(63) Continuation of application No. 18/384,539, filed on Oct. 27, 2023, now Pat. No. 12,183,241, and a continuation of application No. 17/665,893, filed on Feb. 7, 2022, now Pat. No. 11,830,404.

(30) Foreign Application Priority Data

May 26, 2021 (KR) ........................ 10-2021-0067752

(51) Int. Cl.
*G09G 3/20* (2006.01)

(52) U.S. Cl.
CPC ..... *G09G 3/2003* (2013.01); *G09G 2310/027* (2013.01); *G09G 2320/0257* (2013.01)

(58) Field of Classification Search
CPC ..... G09G 2310/027; G09G 2320/0257; G09G 3/2003
See application file for complete search history.

(56) References Cited

U.S. PATENT DOCUMENTS

| | | | |
|---|---|---|---|
| 7,675,492 | B2 | 3/2010 | Park et al. |
| 8,922,595 | B2 | 12/2014 | Ahn et al. |
| 9,928,773 | B2 | 3/2018 | Kim et al. |

(Continued)

FOREIGN PATENT DOCUMENTS

| | | | |
|---|---|---|---|
| KR | 1020150034948 | A | 4/2015 |
| KR | 1020160124360 | A | 10/2016 |

(Continued)

*Primary Examiner* — Kenneth Bukowski
(74) *Attorney, Agent, or Firm* — CANTOR COLBURN LLP

(57) ABSTRACT

A display apparatus includes a display panel, an afterimage compensator and a data driver. The display panel displays an image. The afterimage compensator writes first stress data of input image data corresponding to a first area to a first memory area in a first block size and second stress data of the input image data corresponding to a second area to a second memory area in a second block size different from the first block size and compensates a grayscale value of the input image data based on the first stress data and the second stress data. The data driver generates a data voltage based on a compensated grayscale value and outputs the data voltage to the display panel.

18 Claims, 12 Drawing Sheets

(56) References Cited

U.S. PATENT DOCUMENTS

| | | | |
|---|---|---|---|
| 11,238,787 | B2 | 2/2022 | An |
| 11,295,677 | B2 | 4/2022 | An et al. |
| 2015/0194096 | A1 | 7/2015 | Chung et al. |
| 2016/0140895 | A1 | 5/2016 | Park et al. |
| 2016/0189337 | A1 | 6/2016 | Song |
| 2016/0307492 | A1 | 10/2016 | Kim |
| 2018/0012530 | A1 | 1/2018 | Lee et al. |
| 2018/0012563 | A1 | 1/2018 | Lee et al. |
| 2019/0057652 | A1 | 2/2019 | Lee |
| 2019/0206315 | A1 | 7/2019 | Park et al. |
| 2019/0333452 | A1 | 10/2019 | Kim et al. |
| 2021/0225326 | A1 | 7/2021 | Matsumoto et al. |

FOREIGN PATENT DOCUMENTS

| | | | |
|---|---|---|---|
| KR | 1020180042883 | A | 4/2018 |
| KR | 1020190081471 | A | 7/2019 |
| KR | 1020190088150 | A | 7/2019 |
| KR | 1020190125551 | A | 11/2019 |
| KR | 102227636 | B1 | 3/2021 |

FIG. 6

| ADDR | MSB | SDATA |
|---|---|---|
| 1 | 0 | SDATA1 |
| 2 | 0 | SDATA2 |
| 3 | 0 | SDATA3 |
| 4 | 1 | ADDR1001 |
| 5 | 0 | SDATA5 |
| 6 | 0 | SDATA6 |
| 7 | 0 | SDATA7 |
| 8 | 1 | ADDR1017 |

FIG. 7

| ADDR | SDATA |
|---|---|
| 1001 | SDATA1001 |
| 1002 | SDATA1002 |
| 1003 | SDATA1003 |
| 1004 | SDATA1004 |
| 1005 | SDATA1005 |
| 1006 | SDATA1006 |
| 1007 | SDATA1007 |
| 1008 | SDATA1008 |
| 1009 | SDATA1009 |
| 1010 | SDATA1010 |
| 1011 | SDATA1011 |
| 1012 | SDATA1012 |
| 1013 | SDATA1013 |
| 1014 | SDATA1014 |
| 1015 | SDATA1015 |
| 1016 | SDATA1016 |
| 1017 | SDATA1017 |
| 1018 | SDATA1018 |
| 1019 | SDATA1019 |
| 1020 | SDATA1020 |
| ⋮ | ⋮ |

DISPLAY APPARATUS AND METHOD OF DRIVING DISPLAY PANEL USING THE SAME

This application is a continuation of U.S. patent application Ser. No. 18/384,539, filed on Oct. 27, 2023, which is a continuation of U.S. patent application Ser. No. 17/665,893, filed on Feb. 7, 2022, which claims priority to Korean Patent Application No. 10-2021-0067752, filed on May 26, 2021, and all the benefits accruing therefrom under 35 U.S.C. § 119, the content of which in its entirety is herein incorporated by reference.

BACKGROUND

1. Field

Embodiments of the invention relate to a display apparatus and a method of driving a display panel using the display apparatus. More particularly, embodiments of the invention relate to a display apparatus including an afterimage compensator writing stress data corresponding to a first area to a first memory area in a first block size and stress data corresponding to a second area to a second memory area in a second block size and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of subpixels. The display panel driver includes a gate driver, a data driver and a driving controller. The gate driver outputs gate signals to the gate lines, the data driver outputs data voltages to the data lines, and the driving controller controls the gate driver and the data driver.

The driving controller may determine a degree of deterioration by calculating an amount of usage of each pixel based on accumulated information of the input image data and may compensate the input image data based on the degree of deterioration to compensate an afterimage.

Since an amount of data to be stored is very large when an amount of usage is accumulated for each pixel, the amount of the usage may be accumulated based on a block including n×n pixels (n is a natural number) in order to minimize a memory size.

SUMMARY

When a size of a block is set to be small, an accuracy of afterimage compensation may be enhanced, but a memory usage may be increased so that a power consumption may be increased and a size of the display panel driver may be increased.

In contrast, when the size of the block is set to be large, a size of the display panel driver may be reduced, but the accuracy of the afterimage compensation may be deteriorated.

Embodiments of the invention provide a display apparatus reducing a memory usage and enhancing an accuracy of compensation.

Embodiments of the invention also provide a method of driving a display panel using the display apparatus.

In an embodiment of a display apparatus according to the invention, the display apparatus includes a display panel, an afterimage compensator and a data driver. The display panel displays an image. The afterimage compensator writes first stress data of input image data corresponding to a first area to a first memory area in a first block size and second stress data of the input image data corresponding to a second area to a second memory area in a second block size different from the first block size and compensates a grayscale value of the input image data based on the first stress data and the second stress data. The data driver generates a data voltage based on a compensated grayscale value and outputs the data voltage to the display panel.

In an embodiment, the second area may have a possibility of occurrence of afterimage greater than a possibility of occurrence of afterimage of the first area. The second block size may be smaller than the first block size.

In an embodiment, when a difference between accumulated stress data of an input block and accumulated stress data of an adjacent block which is adjacent to the input block is greater than a predetermined value, the input block may be determined as the second area.

In an embodiment, the afterimage compensator may include an edge determiner which determines whether the input block is the first area or the second area based on the difference between the accumulated stress data of the input block and the accumulated stress data of the adjacent block, a first accumulator which accumulates the first stress data corresponding to the first area in the first block size, a second accumulator which accumulates the second stress data corresponding to the second area in the second block size and a grayscale value compensator which compensates the grayscale value of the input image data based on the first stress data and the second stress data.

In an embodiment, when the accumulated stress data of the input block is BS4, accumulated stress data of a left adjacent block of the input block is BS3, accumulated stress data of an upper adjacent block of the input block is BS2 and accumulated stress data of an upper left adjacent block of the input block is BS1, RX=BS4−BS1, RY=BS3−BS2 and $G=(RX^2/4)+(RY^2/4)$. When G is greater than a threshold value, the edge determiner may determine the input block as the second area.

In an embodiment, in an initial operation of the display apparatus, all stress data of the input image data may be stored in the first block size. When the second area is determined, stress data of the input image data corresponding to the second area may be stored in the second block size smaller than the first block size.

In an embodiment, the first memory area may include an address area of the first stress data, an index area of the first stress data and a data area of the first stress data.

In an embodiment, the second memory area may include an address area of the second stress data and a data area of the second stress data.

In an embodiment, the display apparatus may further include a first memory including the first memory area and the second memory area. The first memory may be a volatile memory.

In an embodiment, the display apparatus may further include a second memory. When the display apparatus is turned-off, the first stress data stored in the first memory area and the second stress data stored in the second memory area may be stored in the second memory. The second memory may be a non-volatile memory.

In an embodiment, while the display apparatus is turned-on, the first stress data stored in the first memory area and the second stress data stored in the second memory area may be stored in the second memory in a predetermined period.

In an embodiment, the index area of the first stress data may store zero corresponding to the first area. When the first area is converted to the second area, a value of the index area of the first stress data may be changed from zero to one and an address of the second memory area may be written in the data area of the first stress data.

In an embodiment, the display apparatus may further include a first memory including the first memory area and a second memory including the second memory area. The first memory and the second memory may be volatile memories.

In an embodiment, the display apparatus may further include a third memory. When the display apparatus is turned-off, the first stress data stored in the first memory area and the second stress data stored in the second memory area may be stored in the third memory. The third memory may be a non-volatile memory.

In an embodiment, the afterimage compensator may further write third stress data of the input image data corresponding to a third area to a third memory area in a third block size different from the first block size and the second block size and may compensate the grayscale value of the input image data based on the first stress data, the second stress data and the third stress data.

In an embodiment, the second area may have a possibility of occurrence of afterimage greater than a possibility of occurrence of afterimage of the first area. The third area may have a possibility of occurrence of afterimage greater than the possibility of the occurrence of the afterimage of the second area. The second block size may be smaller than the first block size. The third block size may be smaller than the second block size.

In an embodiment of a method of driving a display panel according to the invention, the method includes storing first stress data of input image data corresponding to a first area in a first block size, storing second stress data of the input image data corresponding to a second area in a second block size different from the first block size, compensating a grayscale value of the input image data based on the first stress data and the second stress data, generating a data voltage based on a compensated grayscale value and outputting the data voltage to the display panel.

In an embodiment, the method may further include reading accumulated stress data of an input block of the input image data, averaging new stress data of the input block in the second block size smaller than the first block size and accumulating averaged stress data when an index value of the accumulated stress data in the second block size of the input block is one, determining whether the input block is an edge area based on a difference between the accumulated stress data of the input block and accumulated stress data of an adjacent block which is adjacent to the input block when the index value of the accumulated stress data of the input block is zero, averaging the new stress data of the input block in the first block size and accumulating averaged stress data in the first block size when the input block is not the edge area and changing the index value of the accumulated stress data of the input block from zero to one, averaging the new stress data of the input block in the second block size and accumulating the averaged stress data in the second block size when the input block is the edge area.

In an embodiment, the method may further include reading accumulated stress data of an input block of the input image data, averaging new stress data of the input block in a third block size smaller than the second block size and accumulate averaged stress data in the third block size when an index value of the accumulated stress data of the input block is two, determining whether the input block is a first edge area based on a difference between the accumulated stress data of the input block and accumulated stress data of an adjacent block adjacent to the input block when the index value of the accumulated stress data of the input block is one, averaging the new stress data of the input block in the second block size smaller than the first block size and accumulating averaged stress data in the second block size when the index value of the accumulated stress data of the input block is one and the input block is not the first edge area and changing the index value of the accumulated stress data of the input block from one to two, average the new stress data of the input block in the third block size and accumulating the averaged stress data in the third block size when the index value of the accumulated stress data of the input block is one and the input block is the first edge area.

In an embodiment, the method may further include determining whether the input block is a second edge area based on the difference between the accumulated stress data of the input block and the accumulated stress data of the adjacent block adjacent to the input block when the index value of the accumulated stress data of the input block is zero, averaging the new stress data of the input block in the first block size and accumulating averaged stress data in the first block size when the index value of the accumulated stress data of the input block is zero and the input block is not the second edge area and changing the index value of the accumulated stress data of the input block from zero to one, averaging new stress data of the input block in the second block size and accumulating the averaged stress data in the second block size when the index value of the accumulated stress data of the input block is zero and the input block is the second edge area.

By the embodiments of the display apparatus and the method of driving the display panel, the display apparatus includes the afterimage compensator writing the stress data corresponding to the first area in the first memory area in the first block size and the stress data corresponding to the second area in the second memory area in the second block size so that the memory usage and the power consumption may be reduced and the accuracy of the compensation may be enhanced.

Under actual usage conditions, the afterimage does not occur uniformly over the entire display panel, but often occurs according to a shape of a pattern frequently used by a user. Thus, the resolution of the afterimage compensation may be selectively increased in an area having a high possibility of occurrence of the afterimage so that the memory usage and the power consumption may be reduced and the accuracy of the compensation may be enhanced.

BRIEF DESCRIPTION OF THE DRAWINGS

The above and other features and advantages of the invention will become more apparent by describing in detailed embodiments thereof with reference to the accompanying drawings, in which:

FIG. 6 is a diagram illustrating a first memory area storing first stress data having the first block size of FIG. 3;

FIG. 7 is a diagram illustrating a second memory area storing second stress data having the second block size of FIG. 3;

DETAILED DESCRIPTION

Figure 1:
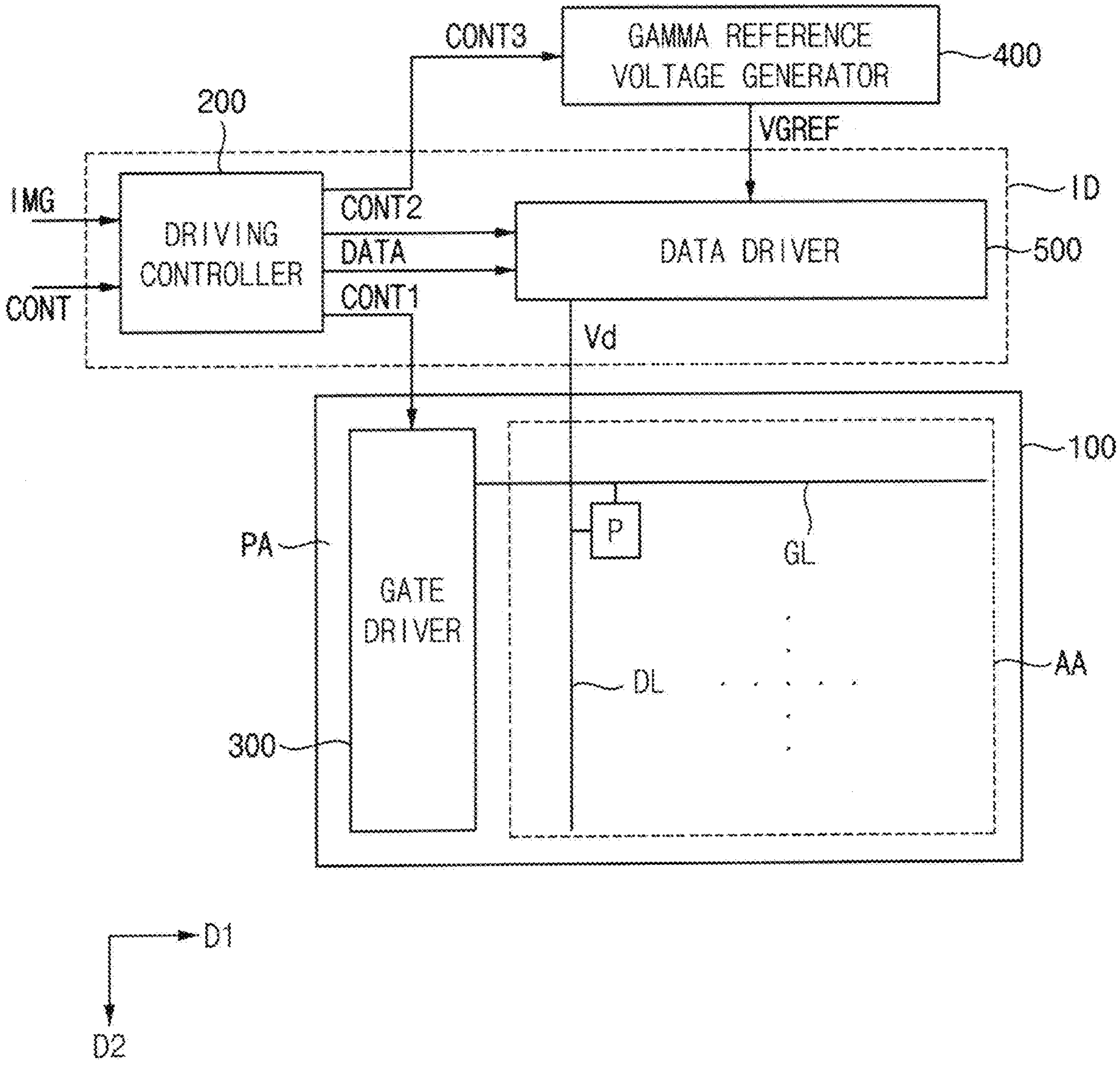
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400 and a data driver 500.

In an embodiment, the driving controller 200 and the data driver 500 may be integrally provided or unitary with each other. In another embodiment, the driving controller 200, the gamma reference voltage generator 400 and the data driver 500 may be integrally provided or unitary with one another.

A driving module including at least the driving controller 200 and the data driver 500 which are integrally provided or unitary with each other may be referred to as to an integrated driver ID.

The display panel 100 has a display region AA in which an image is displayed and a peripheral region PA adjacent to the display region AA.

The display panel 100 includes a plurality of gate lines GL, a plurality of data lines DL and a plurality of subpixels P connected to corresponding gate lines GL of the plurality of gate lines GL and corresponding data lines DL of the plurality of data lines DL. The gate lines GL may extend in a first direction D1 and the data lines DL may extend in a second direction D2 crossing the first direction D1.

The driving controller 200 receives input image data IMG and an input control signal CONT from an external apparatus. In an embodiment, the input image data IMG may include red image data, green image data and blue image data. In an embodiment, the input image data IMG may include white image data. In an embodiment, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 2 to 9 in detail.

The gate driver 300 generates gate signals driving the gate lines GL in response to the first control signal CONT1 received from the driving controller 200. The gate driver 300 outputs the gate signals to the gate lines GL. In an embodiment, the gate driver 300 may sequentially output the gate signals to the gate lines GL, for example. In an embodiment, the gate driver 300 may be disposed (e.g., mounted) on the peripheral region PA of the display panel 100, for example. In an embodiment, the gate driver 300 may be integrated on the peripheral region PA of the display panel 100, for example.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages Vd having an analog type using the gamma reference voltages VGREF. The data driver 500 outputs the data voltages Vd to the data lines DL.

Figure 2:
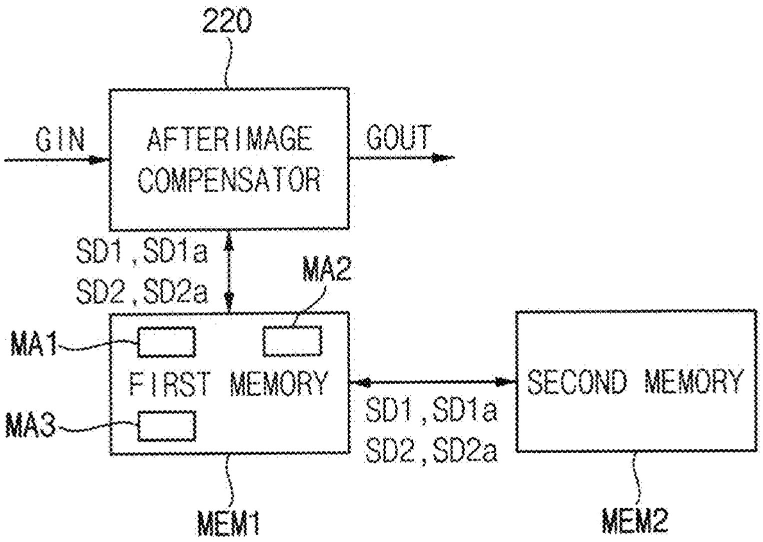
FIG. 2 is a block diagram illustrating an afterimage compensator, a first memory and a second memory of a driving controller of FIG. 1.
Figure 3:
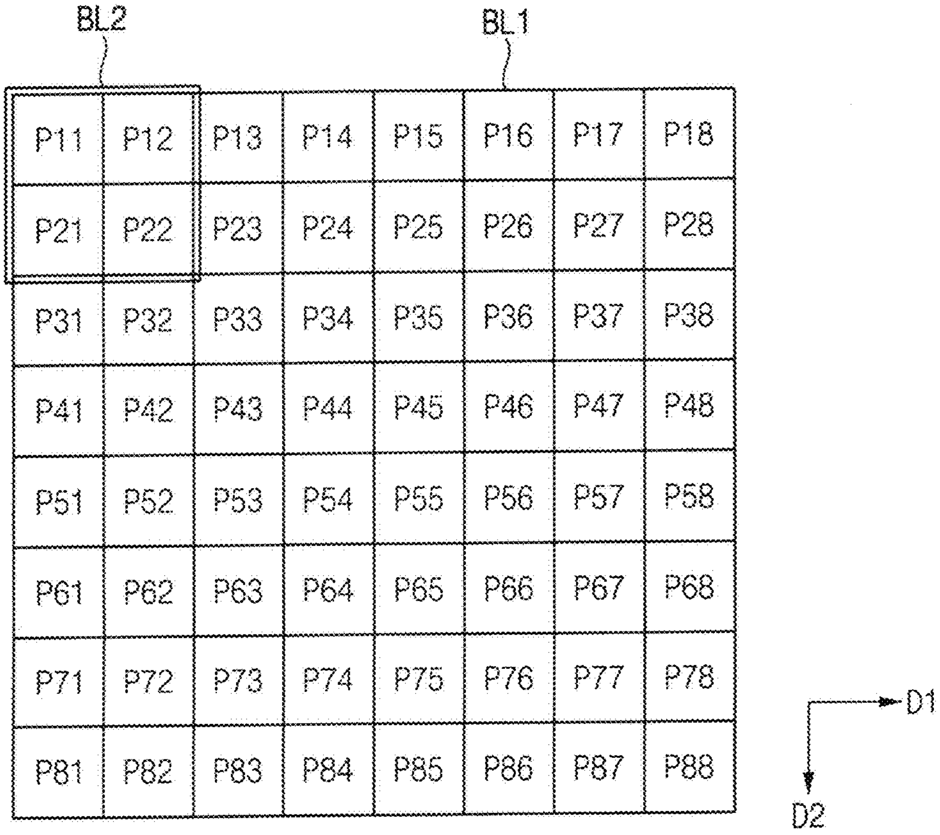
FIG. 3 is a conceptual diagram illustrating a first block size and a second block size of a display panel of FIG. 1.

FIG. 2 is a block diagram illustrating an afterimage compensator 220, a first memory MEM1 and a second memory MEM2 of the driving controller 200 of FIG. 1. FIG. 3 is a conceptual diagram illustrating a first block size BL1 and a second block size BL2 of the display panel 100 of FIG. 1.

Referring to FIGS. 1 to 3, the driving controller 200 may include the afterimage compensator 220. The afterimage compensator 220 may write first stress data SD1 of the input image data IMG corresponding to a first area to a first memory area MA1 in the first block size BL1 and second stress data SD2 of the input image data IMG corresponding to a second area to a second memory area MA2 in the second block size BL2 different from the first block size BL1. The afterimage compensator 220 may compensate grayscale values of the input image data IMG based on the first stress data SD1 and the second stress data SD2.

An input grayscale value inputted to the afterimage compensator 220 may be denoted by GIN. A compensated output grayscale value outputted by the afterimage compensator 220 may be denoted by GOUT. The data driver 500 may generate the data voltage Vd based on the compensated grayscale value GOUT and output the data voltage Vd to the display panel 100.

Herein, the second area may have a possibility of occurrence of afterimage greater than a possibility of occurrence of afterimage of the first area and the second block size BL2 may be smaller than the first block size BL1.

In FIG. 3, for example, the first block size BL1 may be 8×8 pixels including pixels P11 to P88 in eight rows and eight columns and the second block size BL2 may be 2×2 pixels including pixels P11, P12, P21 and P22 in two rows and two columns. However, the invention may not be limited to the number of pixels included in the first block size BL1 and the second block size BL2 in the illustrated embodiment.

The afterimage compensation may be performed according to colors of the subpixels. In an embodiment, when the display panel 100 includes a red subpixel, a green subpixel or a blue subpixel, the pixels in eight rows and eight columns shown in FIG. 3 may include adjacent red subpixels in eight rows and eight columns, adjacent green subpixels in eight rows and eight columns, or adjacent blue subpixels in eight rows and eight columns.

For a normal area (the first area) having a relatively low possibility of occurrence of afterimage, the stress data may be accumulated in the first block size BL1 which is relatively great. In contrast, for an afterimage occurrence area (the second area) having a relatively high possibility of occurrence of afterimage, the stress data may be accumulated in the second block size BL2 which is relatively small. A compensation resolution for the afterimage occurrence area (the second area) having the relatively high possibility of occurrence of afterimage may be increased so that an accuracy of the compensation for the afterimage occurrence area (the second area) having the relatively high possibility of occurrence of afterimage may be enhanced. In contrast, the compensation resolution for the normal area (the first area) having the relatively low possibility of occurrence of afterimage may not be increased so that the power consumption and the memory usage may be reduced.

The accumulated stress data may be determined by a grayscale value of the input image data IMG or a luminance corresponding to the grayscale value. In addition, the accumulated stress data may be determined by a temperature of the display apparatus.

The first stress data SD1 may be stored in the first memory area MA1 and the second stress data SD2 may be stored in the second memory area MA2. In the illustrated embodiment, the first memory MEM1 may include the first memory area MA1 and the second memory area MA2.

In an embodiment, the first memory MEM1 may be a volatile memory, for example. In an embodiment, the first memory MEM1 may be a static random access memory ("SRAM"), for example.

The afterimage compensator 220 may write the first stress data SD1 and the second stress data SD2 to the first memory MEM1. In addition, the afterimage compensator 220 may read the accumulated first stress data SD1*a* and the accumulated second stress data SD2*a* from the first memory MEM1.

The first stress data SD1 stored in the first memory area MA1 and the second stress data SD2 stored in the second memory area MA2 may be stored in the second memory MEM2.

In an embodiment, the second memory MEM2 may be a non-volatile memory, for example. In an embodiment, the second memory MEM2 may be a flash memory, for example.

In an embodiment, when the display apparatus is turned-off, the first stress data SD1 stored in the first memory area MA1 and the second stress data SD2 stored in the second memory area MA2 may be stored in the second memory MEM2, for example.

In an embodiment, while the display apparatus is turned-on, the first stress data SD1 stored in the first memory area MA1 and the second stress data SD2 stored in the second memory area MA2 may be stored in the second memory MEM2 in a predetermined period, for example.

When the display apparatus is turned-on from a turned-off state, the first memory MEM1 may read the accumulated first stress data SD1*a* and the accumulated second stress data SD2*a* from the second memory MEM2.

In an embodiment, the first memory MEM1 may further include a third memory area MA3 when there are three stress data. This embodiment will be described later with reference to FIG. 10.

Figure 4:
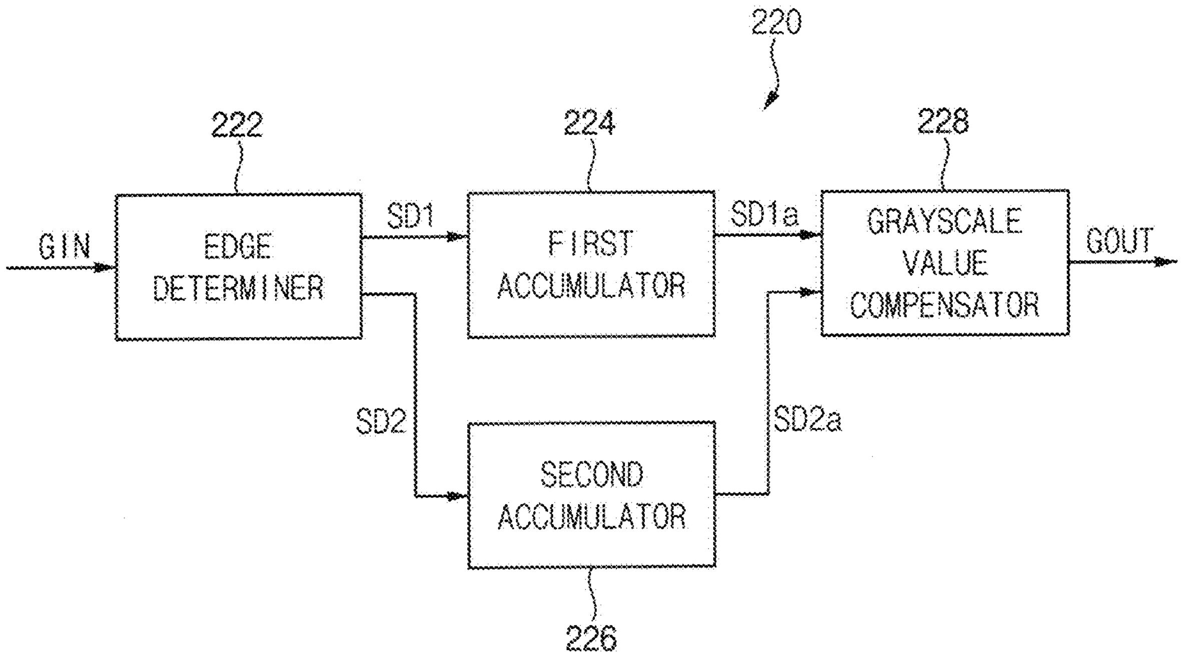
FIG. 4 is a block diagram illustrating an afterimage compensator of FIG. 2.

FIG. 4 is a block diagram illustrating the afterimage compensator 220 of FIG. 2.

Referring to FIGS. 1 to 4, the afterimage compensator 220 may include an edge determiner 222, a first accumulator 224, a second accumulator 226 and a grayscale value compensator 228.

The edge determiner 222 may determine whether an input block is the first area (the normal area having the low possibility of occurrence of afterimage) or the second area (the afterimage occurrence area having the high possibility of occurrence of afterimage) based on a difference between accumulated stress data of the input block and accumulated stress data of an adjacent block which is adjacent to the input block.

When the difference between the accumulated stress data of the input block and the accumulated stress data of the adjacent block is greater than a predetermined value, the input block may be determined as the afterimage occurrence area. Herein, the afterimage occurrence area may be referred to an edge area.

The first accumulator 224 may accumulate the first stress data SD1 corresponding to the first area in the first block size BL1. The accumulated first stress data SD1*a* which are accumulated by the first accumulator 224 may be stored in the first memory MEM1. The accumulated first stress data SD1*a* which are accumulated by the first accumulator 224 may be outputted to the grayscale value compensator 228.

The second accumulator 226 may accumulate the second stress data SD2 corresponding to the second area in the second block size BL2. The accumulated second stress data SD2*a* which are accumulated by the second accumulator 226 may be stored in the first memory MEM1. The accumulated second stress data SD2*a* which are accumulated by the second accumulator 226 may be outputted to the grayscale value compensator 228.

The grayscale value compensator 228 may compensate the grayscale value GIN of the input image data IMG based on the first stress data SD1 and the second stress data SD2 and may output the compensated grayscale value GOUT.

Figure 5A:
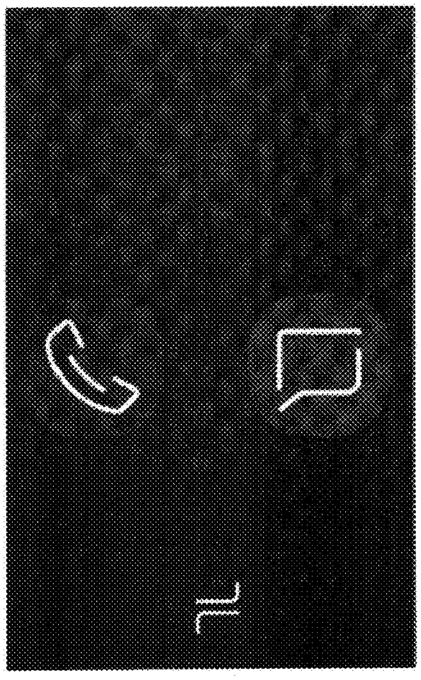
FIG. 5A is a diagram illustrating a compensated image in a comparative embodiment in which stress data are accumulated for each pixel to compensate input image data.
Figure 5B:
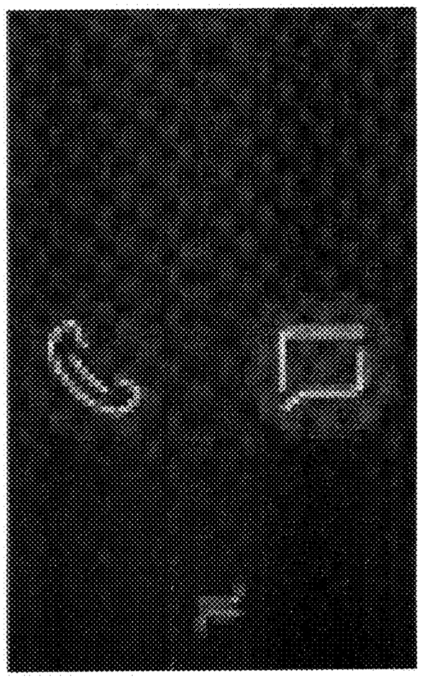
FIG. 5B is a diagram illustrating a compensated image in a comparative embodiment in which stress data are accumulated in a first block size to compensate input image data.
Figure 5C:
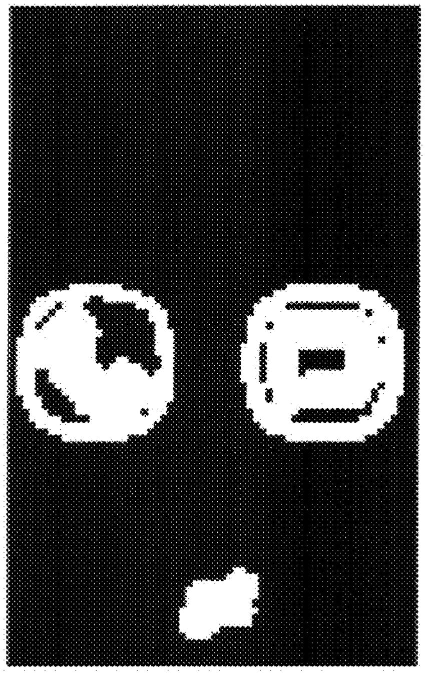
FIG. 5C is a diagram illustrating an edge area determined by an edge determiner of FIG. 4.
Figure 5D:
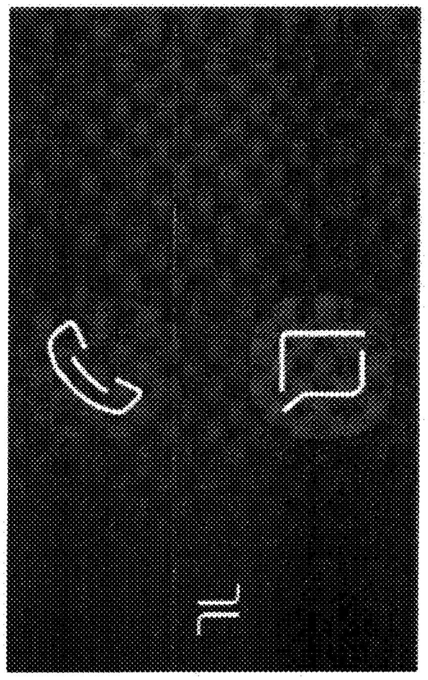
FIG. 5D is a diagram illustrating a compensated image in the embodiment in which input image data are compensated by the afterimage compensator of FIG. 2 using the first block size and the second block size of FIG. 3.

FIG. 5A is a diagram illustrating a compensated image in a comparative embodiment in which stress data are accumulated for each pixel to compensate input image data IMG. FIG. 5B is a diagram illustrating a compensated image in a comparative embodiment in which stress data are accumulated in the first block size BL1 to compensate input image data IMG. FIG. 5C is a diagram illustrating an edge area determined by the edge determiner 222 of FIG. 4. FIG. 5D is a diagram illustrating a compensated image in the illustrated embodiment in which input image data IMG are compensated by the afterimage compensator 220 of FIG. 2 using the first block size BL1 and the second block size BL2 of FIG. 3.

In FIG. 5A, the stress data may be accumulated for each pixel (in a block size of 1×1 pixel) and the input image data IMG may be compensated using the stress data accumulated for each pixel (in the block size of 1×1 pixel). According to the comparative embodiment of FIG. 5A, the edge area may be well compensated but the power consumption may be high and the memory usage may be high.

In FIG. 5B, the stress data may be accumulated in the first block size BL1 of 8×8 pixels and the input image data IMG may be compensated using the stress data accumulated in the first block size BL11 of 8×8 pixels. According to the comparative embodiment of FIG. 5B, the power consumption and the memory usage may be reduced but the accuracy of the compensation may be low.

FIG. 5C represents the edge area determined by the difference between the accumulated stress data of the input block and the accumulated stress data of the adjacent block. A black area in FIG. 5C represents the normal area and a white area in FIG. 5C represents the edge area. The edge area may mean an area where the difference between the accumulated stress data of the area and the accumulated stress data of an adjacent area is great. The edge area may have a high possibility of occurrence of the afterimage.

FIG. 5D represents a result of compensating the input image data IMG by accumulating the stress data in the first block size BL1 of 8×8 pixels for the normal area and compensating the input image data IMG by accumulating the stress data in the second block size BL2 of 2×2 pixels for the edge area. In FIG. 5D, the stress data are accumulated in the first block size BL1 of 8×8 pixels for the normal area so that the power consumption and the memory usage may be reduced and the stress data are accumulated in the second block size BL2 of 2×2 pixels for the edge area so that the accuracy of the compensation may be enhanced.

FIG. 6 is a diagram illustrating the first memory area MA1 (refer to FIG. 2) storing the first stress data SD1 (refer to FIG. 2) having the first block size BL1 of FIG. 3. FIG. 7 is a diagram illustrating the second memory area MA2 (refer to FIG. 2) storing the second stress data SD2 (refer to FIG. 2) having the second block size BL2 of FIG. 3.

Referring to FIGS. 1 to 7, the first stress data SD1 corresponding to the normal area may be stored in the first memory area MA1. The first memory area MA1 may include an address area ADDR of the first stress data SD1, an index area MSB of the first stress data SD1 and a data area SDATA of the first stress data SD1.

When a value of the index area MSB of the first stress data SD1 is zero, the first stress data SD1 may be the normal area. In contrast, when the value of the index area MSB of the first stress data SD1 is one, the first stress data SD1 may not be the normal area but the edge area.

The second stress data SD2 corresponding to the edge area may be stored in the second memory area MA2. The second memory area MA2 may include an address area ADDR of the second stress data SD2 and a data area SDATA of the second stress data SD2. Unlike the first memory area MA1, the second memory area MA2 may not include the index area MSB of the second stress data SD2.

In an initial operation of the display apparatus, all of the stress data of the input image data IMG may be stored in the first block size BL1. When the area having the high possibility of occurrence of afterimage is determined, the stress data of the input image data IMG corresponding to the area having the high possibility of occurrence of afterimage may be stored in the second block size BL2 smaller than the first block size BL1.

In the initial operation of the display apparatus, all values of the index area MSB for an entire area (the first area initially) of the input image data IMG may be zero. As usage time passes, the area having the high possibility of occurrence of afterimage may be determined. When the area having the high possibility of occurrence of afterimage is determined (the area is converted from the first area to the second area), the value of the index area MSB of the first stress data SD1 may be changed from zero to one. In this case, not the stress data but the address of the second memory area MA2 may be written in the data area SDATA of the first stress data SD1.

When all of the first area is changed to the second area as a result of long time use, the effect of reducing the memory usage may not be obtained. Thus, the number of blocks which are changed from the first area to the second area may have a predetermined limit value. In an embodiment, the number of blocks which are changed from the first area to the second area may be set to 20 percent (%) of total blocks, for example.

In FIG. 3, it is exemplified that the first block size BL1 has 8×8 pixels and the second block size BL2 has 2×2 pixels. In this case, when the block size is converted from the first block size BL1 to the second block size BL2, the compensation resolution may be increased sixteen times, and the amount of the stress data may also be increased sixteen times.

In FIG. 6, the index value MSB corresponding to a first address (ADDR=1) is zero and the stress data corresponding to the first address (ADDR=1) are SDATA1. Accordingly, the input image data IMG corresponding to the first address (ADDR=1) may be the first area.

In FIG. 6, the index value MSB corresponding to a second address (ADDR=2) is zero and the stress data corresponding to the second address (ADDR=2) are SDATA2. Accordingly, the input image data IMG corresponding to the second address (ADDR=2) may be the first area.

In FIG. 6, the index value MSB corresponding to a third address (ADDR=3) is zero and the stress data corresponding to the third address (ADDR=3) are SDATA3. Accordingly, the input image data IMG corresponding to the third address (ADDR=3) may be the first area.

In FIG. 6, the index value MSB corresponding to a fourth address (ADDR=4) is one. Accordingly, the input image data IMG corresponding to the fourth address (ADDR=4) may be the second area. When the index value MSB is one, not the stress data but the address of the second memory area MA2 are written in the data area SDATA. The input image data IMG corresponding to the fourth address (ADDR=4) is the second area so that the stress data corresponding to the fourth address (ADDR=4) may be stored in 16 times higher resolution. The stress data corresponding to the fourth address (ADDR=4) may be SDATA1001 to SDATA1016 which are stored in 1001-st address to 1016-th address.

In FIG. 6, the index value MSB corresponding to an eighth address (ADDR=8) is one. Accordingly, the input image data IMG corresponding to the eighth address (ADDR=8) may be the second area. The input image data IMG corresponding to the eighth address (ADDR=8) is the second area so that the stress data corresponding to the eighth address (ADDR-8) may be stored in 16 times higher resolution. The stress data corresponding to the eighth address (ADDR=8) may be SDATA1017 to SDATA1032 which are stored in 1017-th address to 1032-nd address.

Figure 8:
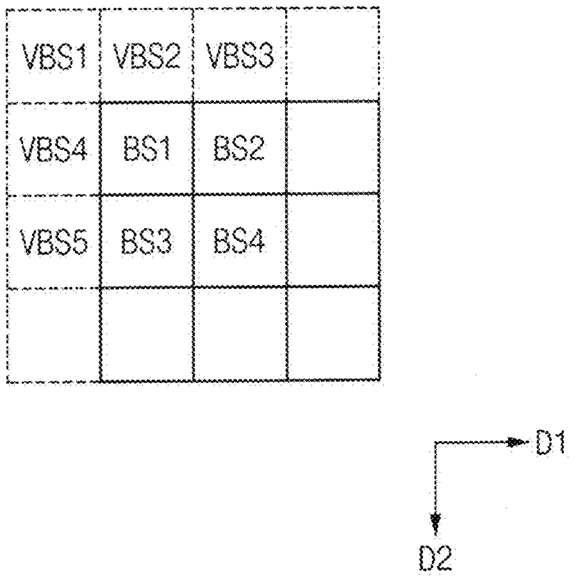
FIG. 8 is a conceptual diagram illustrating a method of determining the edge area by the edge determiner of FIG. 4.

FIG. 8 is a conceptual diagram illustrating a method of determining the edge area by the edge determiner 222 of FIG. 4.

Referring to FIGS. 1 to 8, the edge determiner 222 may determine whether an input block is the first area (the normal area) or the second area (the edge area) based on a difference between accumulated stress data of the input block and accumulated stress data of an adjacent block which is adjacent to the input block.

In an embodiment, when accumulated stress data of the input block is BS4, accumulated stress data of a left adjacent block of the input block is BS3, accumulated stress data of an upper adjacent block of the input block is BS2 and accumulated stress data of an upper left adjacent block of the input block is BS1, RX=BS4−BS1, RY=BS3−BS2 and $G=(RX^2/4)+(RY^2/4)$, for example.

Herein, when G is greater than a threshold value, the edge determiner 222 may determine the input block as the second area.

In FIG. 8, BS1, BS2, BS3 and BS4 may be disposed inside of a display area and VBS1, VBS2, VBS3, VBS4 and VBS5 may be disposed outside of the display area.

When the accumulated stress data of the input block is BS2, the upper adjacent block of the input block and the upper left adjacent block of the input block are disposed outside of the display area so that the value G may not be obtained using the above equations.

Accordingly, in this case, the accumulated stress data of the upper block of BS2 may be generated as VBS3 and the accumulated stress data of the upper left block of BS2 may be generated as VBS2. In an embodiment, the VBS3 may be generated by copying the BS2 and the VBS2 may be generated by copying the BS1, for example.

Thus, when the accumulated stress data of the input block is BS2, the value G may be calculated using VBS2, VBS3, BS1 and BS2.

Similarly, when the accumulated stress data of the input block is BS3, the left adjacent block of the input block and the upper left adjacent block of the input block are disposed outside of the display area so that the value G may not be obtained using the above equations.

Accordingly, in this case, the accumulated stress data of the left block of BS3 may be generated as VBS5 and the accumulated stress data of the upper left block of BS3 may be generated as VBS4. In an embodiment, the VBS5 may be generated by copying the BS3 and the VBS4 may be generated by copying the BS1, for example.

Thus, when the accumulated stress data of the input block is BS3, the value G may be calculated using VBS4, BS1, VBS5 and BS3.

When the accumulated stress data of the input block is BS1, all of the left adjacent block of the input block, the upper adjacent block of the input block and the upper left adjacent block of the input block are disposed outside of the display area so that the value G may not be obtained using the above equations.

When the stress data VBS4 for the left adjacent block of the input block, the stress data VBS2 for the upper adjacent block of the input block and the stress data VBS1 for the upper left adjacent block of the input block are generated by copying the BS1, all of the four data to obtain the value G have the same value so that the input block BS1 may not be determined as the edge area by the value G.

Accordingly, for the BS1 block, the edge are may not be determined by the value G. Instead, when all of the blocks of BS2, BS3, and BS4 are determined as the edge areas, the BS1 block may also be determined as the edge area.

Figure 9:
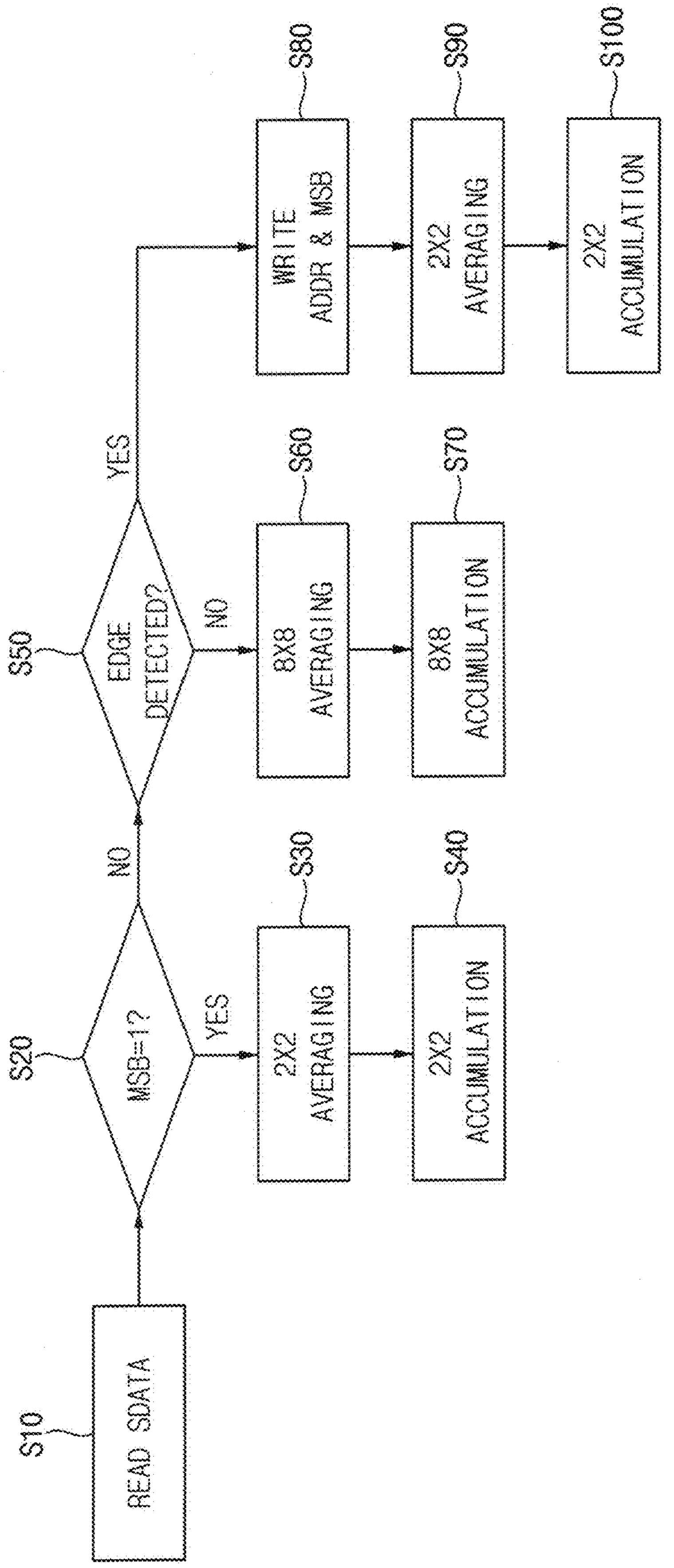
FIG. 9 is a flowchart diagram illustrating an operation of the afterimage compensator of FIG. 2.

FIG. 9 is a flowchart diagram illustrating an operation of the afterimage compensator 220 of FIG. 2.

Referring to FIGS. 1 to 9, the method of driving the display panel 100 may include storing the first stress data SD1 of the input image data IMG corresponding to the first area in the first block size BL1, storing the second stress data SD2 of the input image data IMG corresponding to the second area in the second block size BL2 different from the first block size BL1, compensating the grayscale value GIN of the input image data IMG based on the first stress data SD1 and the second stress data SD2, generating the data voltage Vd based on the compensated grayscale value GOUT and outputting the data voltage Vd to the display panel 100.

The afterimage compensator 220 may read the accumulated stress data of the input block of the input image data IMG (operation S10).

When the index value MSB of the accumulated stress data of the input block is one (operation S20), the afterimage compensator 220 may average new stress data of the input block in the second block size BL2 (e.g. 2×2 pixels) which is smaller than the first block size BL1 (e.g. 8×8 pixels) and accumulate the averaged stress data (operations S30 and S40).

When the index value MSB of the accumulated stress data of the input block is zero (operation S20), the afterimage compensator 220 may determine whether the input block is the edge area based on the difference between the accumulated stress data of the input block and the accumulated stress data of the adjacent block which is adjacent to the input block (operation S50).

When the input block is not the edge area (operation S50), the afterimage compensator 220 may average new stress data of the input block in the first block size BL1 (e.g. 8×8 pixels) and accumulate the averaged stress data (operations S60 and S70).

When the input block is the edge area (operation S50), the afterimage compensator 220 may change the index value MSB of the accumulated stress data of the input block from zero to one (operation S80) and average new stress data of the input block in the second block size BL2 (e.g. 2×2 pixels) and accumulate the averaged stress data (operations S90 and S100).

In the illustrated embodiment, the display apparatus includes the afterimage compensator 220 writing the stress data corresponding to the first area in the first memory area MA1 in the first block size BL1 and the stress data corresponding to the second area in the second memory area MA2 in the second block size BL2 so that the memory usage and the power consumption may be reduced and the accuracy of the compensation may be enhanced.

Under actual usage conditions, the afterimage does not occur uniformly over the entire display panel, but often occurs according to a shape of a pattern frequently used by a user. Thus, the resolution of the afterimage compensation may be selectively increased in an area having a high possibility of occurrence of the afterimage so that the memory usage and the power consumption may be reduced and the accuracy of the compensation may be enhanced.

Figure 10:
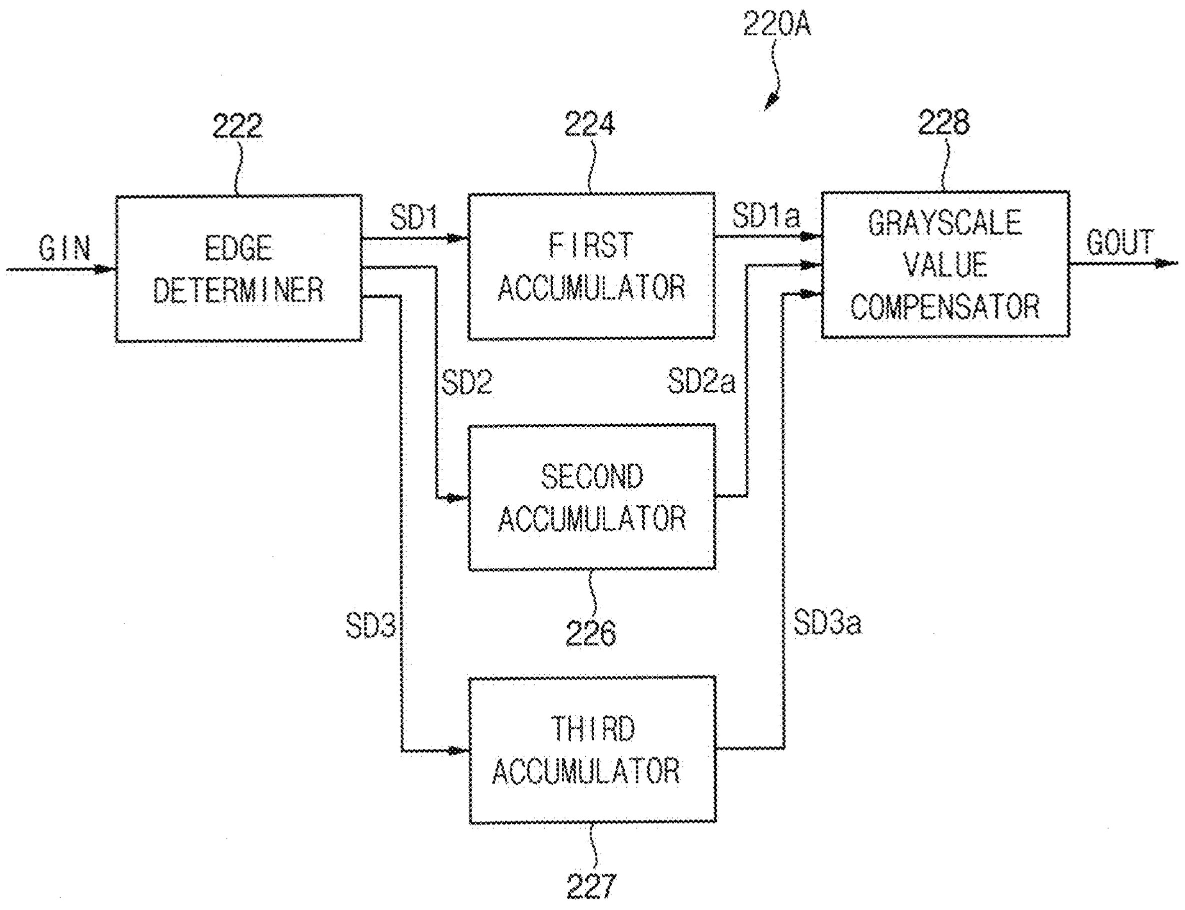
FIG. 10 is a block diagram illustrating an embodiment of an afterimage compensator of a driving controller of a display apparatus according to the invention.
Figure 11:
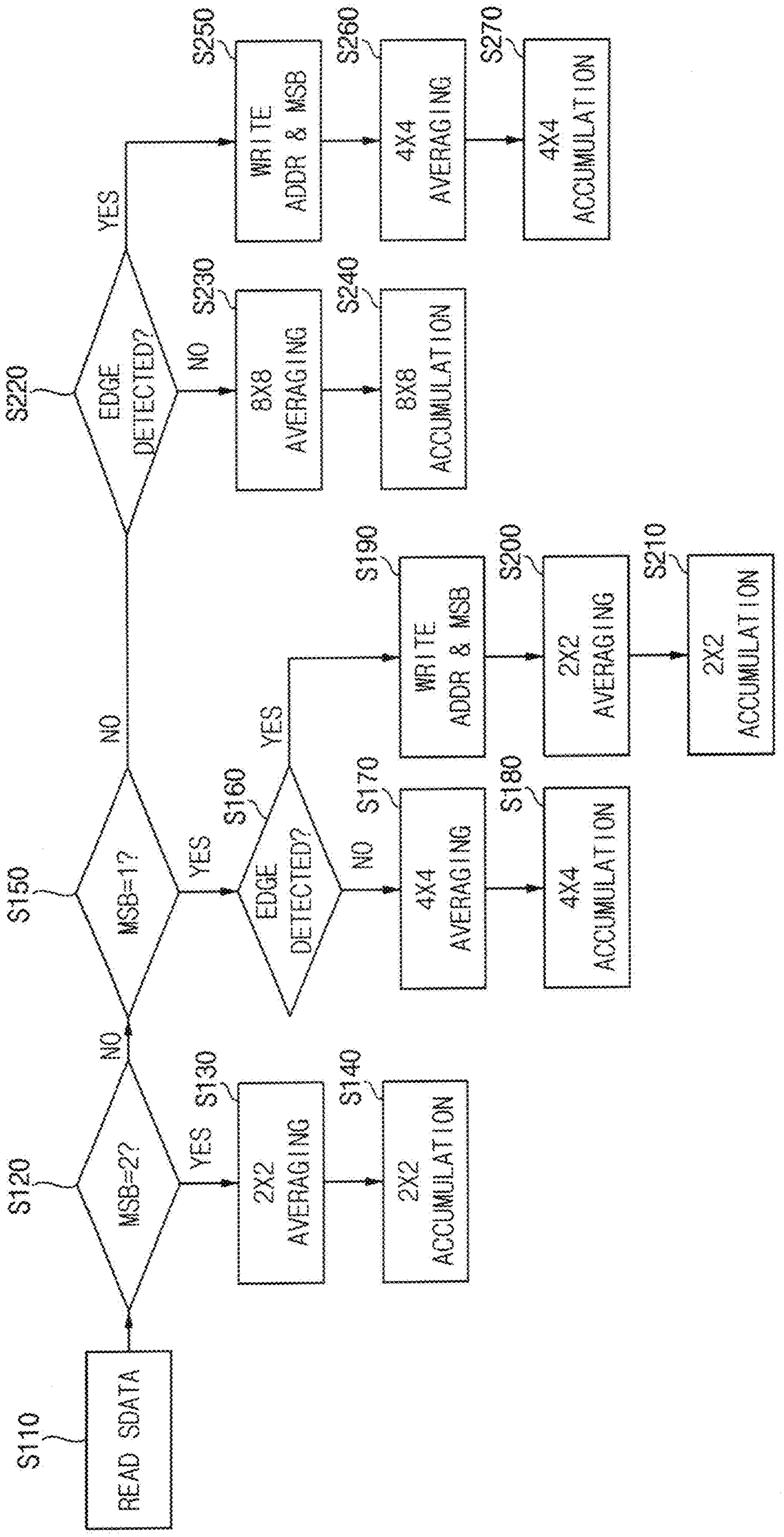
FIG. 11 is a flowchart diagram illustrating an operation of the afterimage compensator of FIG. 10.

FIG. 10 is a block diagram illustrating an embodiment of an afterimage compensator 220A of a driving controller of a display apparatus according to the invention. FIG. 11 is a flowchart diagram illustrating an operation of the afterimage compensator 220A of FIG. 10.

The display apparatus and the method of driving the display panel in the illustrated embodiment is substantially the same as the display apparatus and the method of driving the display panel of the previous embodiment explained referring to FIGS. 1 to 9 except for the structure and the operation of the afterimage compensator. Thus, the same reference numerals will be used to refer to the same or like parts as those described in the previous embodiment of FIGS. 1 to 9 and any repetitive explanation concerning the above elements will be omitted.

Referring to FIGS. 1 to 3, 5A to 8, 10 and 11, the display apparatus includes a display panel 100 and a display panel driver. The display panel driver includes a driving controller 200, a gate driver 300, a gamma reference voltage generator 400 and a data driver 500.

The driving controller 200 may include the afterimage compensator 220A. The afterimage compensator 220A may write first stress data SD1 of the input image data IMG corresponding to a first area to a first memory area MA1 in a first block size BL1, second stress data SD2 of the input image data IMG corresponding to a second area to a second memory area MA2 in a second block size BL2 different from the first block size BL1 and third stress data SD3 of the input image data IMG corresponding to a third area to a third memory area MA3 in a third block size BL3 different from the first block size BL1 and the second block size BL2. The afterimage compensator 220A may compensate grayscale values of the input image data IMG based on the first stress data SD1, the second stress data SD2 and the third stress data SD3.

An input grayscale value inputted to the afterimage compensator 220A may be denoted by GIN. A compensated output grayscale value outputted by the afterimage compensator 220A may be denoted by GOUT. The data driver 500 may generate the data voltage Vd based on the compensated grayscale value GOUT and output the data voltage Vd to the display panel 100.

Herein, the second area may have a possibility of occurrence of afterimage greater than a possibility of occurrence of afterimage of the first area and the second block size BL2 may be smaller than the first block size BL1.

In addition, the third area may have a possibility of occurrence of afterimage greater than the possibility of occurrence of afterimage of the second area and the third block size BL3 may be smaller than the second block size BL2.

In an embodiment, the first block size BL1 may be 8×8 pixels including pixels in eight rows and eight columns, the second block size BL2 may be 4×4 pixels including pixels in four rows and four columns and the third block size BL3 may be 2×2 pixels including pixels in two rows and two columns, for example. However, the invention may not be limited to the predetermined number of pixels included in the first block size BL1, the second block size BL2 and the third block size BL3.

The afterimage compensator 220A may include an edge determiner 222, a first accumulator 224, a second accumulator 226, a third accumulator 227 and a grayscale value compensator 228.

The edge determiner 222 may determine whether an input block is the first area (the normal area having the low possibility of occurrence of afterimage), the second area (an area having the possibility of occurrence of afterimage higher than the possibility of occurrence of afterimage of the first area) or the third area (an area having the possibility of occurrence of afterimage higher than the possibility of occurrence of afterimage of the second area) based on a difference between accumulated stress data of the input block and accumulated stress data of an adjacent block which is adjacent to the input block.

When the input block is in a state of the first area and the difference between the accumulated stress data of the input block and the accumulated stress data of the adjacent block is great, the input block may be determined as the second area.

When the input block is in a state of the second area and the difference between the accumulated stress data of the input block and the accumulated stress data of the adjacent block is great, the input block may be determined as the third area.

The first accumulator 224 may accumulate the first stress data SD1 corresponding to the first area in the first block size BL1. The accumulated first stress data SD1$a$ which are accumulated by the first accumulator 224 may be stored in a first memory MEM1. The accumulated first stress data SD1$a$ which are accumulated by the first accumulator 224 may be outputted to the grayscale value compensator 228.

The second accumulator 226 may accumulate the second stress data SD2 corresponding to the second area in the second block size BL2. The accumulated second stress data SD2$a$ which are accumulated by the second accumulator 226 may be stored in the first memory MEM1. The accumulated second stress data SD2$a$ which are accumulated by the second accumulator 226 may be outputted to the grayscale value compensator 228.

The third accumulator 227 may accumulate the third stress data SD3 corresponding to the third area in the third block size BL3. The accumulated third stress data SD3$a$ which are accumulated by the third accumulator 227 may be stored in the first memory MEM1. The accumulated third stress data SD3$a$ which are accumulated by the third accumulator 227 may be outputted to the grayscale value compensator 228.

The grayscale value compensator 228 may compensate the grayscale value GIN of the input image data IMG based on the first stress data SD1, the second stress data SD2 and the third stress data SD3 and may output the compensated grayscale value GOUT.

The afterimage compensator 220A may read the accumulated stress data of the input block of the input image data IMG (operation S110).

When the index value MSB of the accumulated stress data of the input block is two (operation S120), the afterimage compensator 220A may average new stress data of the input block in the third block size BL3 (e.g. 2×2 pixels) which is smaller than the second block size BL2 (e.g. 4×4 pixels) and accumulate the averaged stress data (operations S130 and S140).

When the index value MSB of the accumulated stress data of the input block is one (operation S150), the afterimage compensator 220A may determine whether the input block is a first edge area based on the difference between the accumulated stress data of the input block and the accumulated stress data of the adjacent block which is adjacent to the input block (operation S160).

When the index value MSB of the accumulated stress data of the input block is one and the input block is not the first edge area (operation S160), the afterimage compensator 220A may average new stress data of the input block in the second block size BL2 (e.g. 4×4 pixels) which is smaller than the first block size BL1 (e.g. 8×8 pixels) and accumulate the averaged stress data (operations S170 and S180).

When the index value MSB of the accumulated stress data of the input block is one and the input block is the first edge area (operation S160), the afterimage compensator 220A may change the index value MSB of the accumulated stress data of the input block from one to two (operation S190) and average new stress data of the input block in the third block size BL3 (e.g. 2×2 pixels) and accumulate the averaged stress data (operations S200 and S210).

When the index value MSB of the accumulated stress data of the input block is zero (operation S150), the afterimage compensator 220A may determine whether the input block is a second edge area based on the difference between the accumulated stress data of the input block and the accumulated stress data of the adjacent block which is adjacent to the input block (operation S220).

When the index value MSB of the accumulated stress data of the input block is zero and the input block is not the second edge area (operation S220), the afterimage compensator 220A may average new stress data of the input block in the first block size BL1 (e.g. 8×8 pixels) and accumulate the averaged stress data (operations S230 and S240).

When the index value MSB of the accumulated stress data of the input block is zero and the input block is the second edge area (operation S220), the afterimage compensator 220A may change the index value MSB of the accumulated stress data of the input block from zero to one (operation S250) and average new stress data of the input block in the second block size BL2 (e.g. 4×4 pixels) and accumulate the averaged stress data (operations S260 and S270).

The first stress data SD1 may be stored in the first memory area MA1, the second stress data SD2 may be stored in the second memory area MA2 and the third stress data SD3 may be stored in the third memory area MA3. In the illustrated embodiment, the first memory MEM1 may include the first memory area MA1, the second memory area MA2 and the third memory area MA3.

In an embodiment, the first memory MEM1 may be a volatile memory, for example. In an embodiment, the first memory MEM1 may be an SRAM, for example.

The afterimage compensator 220A may write the first stress data SD1, the second stress data SD2 and the third stress data SD3 to the first memory MEM1. In addition, the afterimage compensator 220A may read the accumulated first stress data SD1*a* , the accumulated second stress data SD2*a* and the accumulated third stress data SD3*a* from the first memory MEM1.

The first stress data SD1 stored in the first memory area MA1, the second stress data SD2 stored in the second memory area MA2 and the third stress data SD3 stored in the third memory area MA3 may be stored in the second memory MEM2.

In an embodiment, the second memory MEM2 may be a non-volatile memory, for example. In an embodiment, the second memory MEM2 may be a flash memory, for example.

In the illustrated embodiment, the display apparatus includes the afterimage compensator 220A writing the stress data corresponding to the first area in the first memory area MA1 in the first block size BL1, the stress data corresponding to the second area in the second memory area MA2 in the second block size BL2 and the stress data corresponding to the third area in the third memory area MA3 in the third block size BL3 so that the memory usage and the power consumption may be reduced and the accuracy of the compensation may be enhanced.

Under actual usage conditions, the afterimage does not occur uniformly over the entire display panel, but often occurs according to a shape of a pattern frequently used by a user. Thus, the resolution of the afterimage compensation may be selectively increased in an area having a high possibility of occurrence of the afterimage so that the memory usage and the power consumption may be reduced and the accuracy of the compensation may be enhanced.

Figure 12:
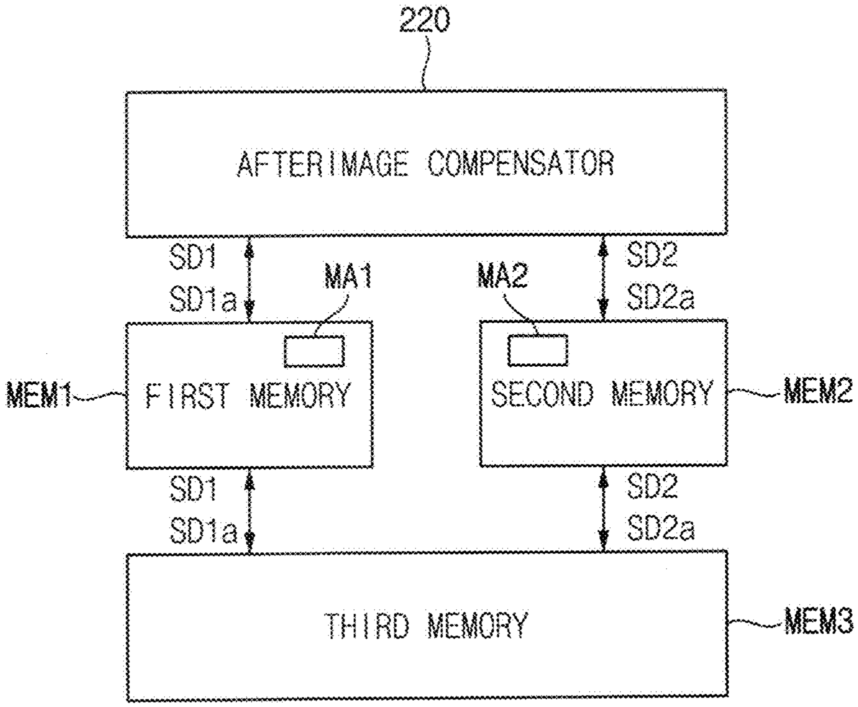
FIG. 12 is a block diagram illustrating an embodiment of an afterimage compensator, a first memory, a second memory and a third memory of a driving controller of a display apparatus according to the invention.

FIG. 12 is a block diagram illustrating an embodiment of an afterimage compensator 220, a first memory MEM1, a second memory MEM2 and a third memory MEM3 of a driving controller 200 of a display apparatus according to the invention.

The display apparatus and the method of driving the display panel in the illustrated embodiment is substantially the same as the display apparatus and the method of driving the display panel of the previous embodiment explained referring to FIGS. 1 to 9 except for the structure and the operation of the memory. Thus, the same reference numerals will be used to refer to the same or like parts as those described in the previous embodiment of FIGS. 1 to 9 and any repetitive explanation concerning the above elements will be omitted.

Referring to FIGS. 1, 3 to 9 and 12, the display apparatus includes a display panel 100 and a display panel driver. The display panel driver includes a driving controller 200, a gate driver 300, a gamma reference voltage generator 400 and a data driver 500.

The driving controller 200 may include the afterimage compensator 220. The afterimage compensator 220 may write first stress data SD1 of the input image data IMG corresponding to a first area to a first memory area MA1 in the first block size BL1 and second stress data SD2 of the input image data IMG corresponding to a second area to a second memory area MA2 in the second block size BL2 different from the first block size BL1. The afterimage compensator 220 may compensate grayscale values of the input image data IMG based on the first stress data SD1 and the second stress data SD2.

An input grayscale value inputted to the afterimage compensator 220 may be denoted by GIN. A compensated output grayscale value outputted by the afterimage compensator 220 may be denoted by GOUT. The data driver 500 may generate the data voltage Vd based on the compensated grayscale value GOUT and output the data voltage Vd to the display panel 100.

Herein, the second area may have a possibility of occurrence of afterimage greater than a possibility of occurrence of afterimage of the first area and the second block size BL2 may be smaller than the first block size BL1.

The first stress data SD1 may be stored in the first memory area MA1 and the second stress data SD2 may be stored in the second memory area MA2. In the illustrated embodiment, a first memory MEM1 may include the first memory area MA1 and a second memory MEM2 may include the second memory area MA2.

In an embodiment, the first memory MEM1 and the second memory MEM2 may be volatile memories, for example. In an embodiment, the first memory MEM1 may be a first SRAM and the second memory MEM2 may be a second SRAM, for example.

The afterimage compensator 220 may respectively write the first stress data SD1 to the first memory MEM1 and the second stress data SD2 to the second memory MEM2. In addition, the afterimage compensator 220 may read the accumulated first stress data SD1*a* from the first memory MEM1 and the accumulated second stress data SD2*a* from the second memory MEM2.

The first stress data SD1 stored in the first memory area MA1 and the second stress data SD2 stored in the second memory area MA2 may be stored in a third memory MEM3.

In an embodiment, the third memory MEM3 may be a non-volatile memory, for example. In an embodiment, the third memory MEM3 may be a flash memory, for example. In an embodiment, when the display apparatus is turned-off, the first stress data SD1 stored in the first memory area MA1 and the second stress data SD2 stored in the second memory area MA2 may be stored in the third memory MEM3, for example.

In an embodiment, while the display apparatus is turned-on, the first stress data SD1 stored in the first memory area MA1 and the second stress data SD2 stored in the second memory area MA2 may be stored in the third memory MEM3 in a predetermined period, for example.

When the display apparatus is turned-on from a turned-off state, the first memory MEM1 may read the accumulated first stress data SD1*a* from the third memory MEM3 and the second memory MEM2 may read the accumulated second stress data SD2*a* from the third memory MEM3.

In the illustrated embodiment, the display apparatus includes the afterimage compensator 220 writing the stress data corresponding to the first area in the first memory area MA1 in the first block size BL1 and the stress data corresponding to the second area in the second memory area MA2 in the second block size BL2 so that the memory usage and the power consumption may be reduced and the accuracy of the compensation may be enhanced.

Under actual usage conditions, the afterimage does not occur uniformly over the entire display panel, but often occurs according to a shape of a pattern frequently used by a user. Thus, the resolution of the afterimage compensation may be selectively increased in an area having a high possibility of occurrence of the afterimage so that the memory usage and the power consumption may be reduced and the accuracy of the compensation may be enhanced.

According to the display apparatus and the method of driving the display panel in the invention, the memory usage and the power consumption may be reduced and the accuracy of the compensation may be enhanced using the afterimage compensator writing the stress data corresponding to the first area in the first memory area in the first block size and the stress data corresponding to the second area in the second memory area in the second block size.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the particular embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An electronic device comprising:

a display panel which displays an image;

a driving device including:

a first memory;

a second memory; and an afterimage compensator which writes first stress data of input image data corresponding to a first area to a first memory area in a first block size and second stress data of the input image data corresponding to a second area to a second memory area in a second block size and which compensates a grayscale value of the input image data based on the first stress data and the second stress data; and a data driver which generates a data voltage based on a compensated grayscale value and which outputs the data voltage to the display panel, wherein the second area has a possibility of an occurrence of afterimage greater than a possibility of an occurrence of afterimage of the first area, wherein when a difference between accumulated stress data of an input block and accumulated stress data of an adjacent block which is adjacent to the input block is greater than a predetermined value, the input block is determined as the second area, and wherein the second block size is equal to or smaller than a half of the first block size.

2. The electronic device of claim 1, wherein the afterimage compensator comprises:

an edge determiner which determines whether the input block is the first area or the second area based on the difference between the accumulated stress data of the input block and the accumulated stress data of the adjacent block;

a first accumulator which accumulates the first stress data corresponding to the first area in the first block size;

a second accumulator which accumulates the second stress data corresponding to the second area in the second block size; and a grayscale value compensator which compensates the grayscale value of the input image data based on the first stress data and the second stress data.

3. The electronic device of claim 2, wherein when the accumulated stress data of the input block is BS4, accumulated stress data of a left adjacent block of the input block is BS3, accumulated stress data of an upper adjacent block of the input block is BS2 and accumulated stress data of an upper left adjacent block of the input block is BS1, RX=BS4−BS1, RY=BS3−BS2 and $G=(RX^2/4)+(RY^2/4)$, wherein when G is greater than a threshold value, the edge determiner determine the input block as the second area.

4. The electronic device of claim 1, wherein, in an initial operation of the display apparatus, all stress data of the input image data are stored in the first block size, and wherein when the second area is determined, stress data of the input image data corresponding to the second area is stored in the second block size.

5. The electronic device of claim 1, wherein the afterimage compensator further writes third stress data of input image data corresponding to a third area to a third memory area in a third block size different from the first block size and the second block size and compensates the grayscale value of the input image data based on the first stress data, the second stress data and the third stress data.

6. The electronic device of claim 5, wherein the second area has the possibility of the occurrence of the afterimage greater than the possibility of the occurrence of the afterimage of the first area, wherein the third area has a possibility of occurrence of afterimage greater than the possibility of the occurrence of the afterimage of the second area, and wherein the third block size is smaller than the second block size.

7. An electronic device comprising:

a display panel which displays an image;

a driving device including:

a first memory;

a second memory; and an afterimage compensator which writes first stress data of input image data corresponding to a first area to a first memory area in a first block size and second stress data of the input image data corresponding to a second area to a second memory area in a second block size and which compensates a grayscale value of the input image data based on the first stress data and the second stress data; and a data driver which generates a data voltage based on a compensated grayscale value and which outputs the data voltage to the display panel, wherein the first area and the second area are defined based on a degree of an occurrence of afterimage so that a possibility of occurrence of afterimage of the first area is different from a possibility of occurrence of afterimage of the second area, wherein the first memory area includes an address area of the first stress data, an index area of the first stress data and a data area of the first stress data, and wherein the second block size is equal to or smaller than a half of the first block size.

8. The electronic device of claim 7, wherein the second memory area includes an address area of the second stress data and a data area of the second stress data.

9. The electronic device of claim 8, wherein the first memory includes the first memory area and the second memory area, and wherein the first memory is a volatile memory.

10. The electronic device of claim 9, further comprising a second memory, wherein when the display apparatus is turned-off, the first stress data stored in the first memory area and the second stress data stored in the second memory area are stored in the second memory, and wherein the second memory is a non-volatile memory.

11. The electronic device of claim 10, wherein while the display apparatus is turned-on, the first stress data stored in the first memory area and the second stress data stored in the second memory area are stored in the second memory in a predetermined period.

12. The electronic device of claim 8, wherein the index area of the first stress data stores zero corresponding to the first area, and wherein when the first area is converted to the second area, a value of the index area of the first stress data is changed from zero to one and an address of the second memory area is written in the data area of the first stress data.

13. The electronic device of claim 8, wherein the first memory includes the first memory area, wherein the second memory includes the second memory area, and wherein the first memory and the second memory are volatile memories.

14. The electronic device of claim 13, further comprising a third memory, wherein when the display apparatus is turned-off, the first stress data stored in the first memory area and the second stress data stored in the second memory area are stored in the third memory, and wherein the third memory is a non-volatile memory.

15. A method of driving a display panel, the method comprising:

storing first stress data of input image data corresponding to a first area in a first block size;

storing second stress data of the input image data corresponding to a second area in a second block size;

compensating a grayscale value of the input image data based on the first stress data and the second stress data;

generating a data voltage based on a compensated grayscale value; and outputting the data voltage to the display panel, wherein the second area has a possibility of an occurrence of the afterimage greater than a possibility of an occurrence of the afterimage of the first area, wherein when a difference between accumulated stress data of an input block and accumulated stress data of an adjacent block which is adjacent to the input block is greater than a predetermined value, the input block is determined as the second area, and wherein the second block size is equal to or smaller than a half of the first block size.

16. The method of claim 15, wherein further comprising:

reading accumulated stress data of the input block of the input image data;

averaging new stress data of the input block in the second block size and accumulating averaged stress data when an index value of the accumulated stress data in the second block size of the input block is one;

determining whether the input block is an edge area based on a difference between the accumulated stress data of the input block and accumulated stress data of the adjacent block which is adjacent to the input block when the index value of the accumulated stress data of the input block is zero;

averaging the new stress data of the input block in the first block size and accumulating averaged stress data in the first block size when the input block is not the edge area; and changing the index value of the accumulated stress data of the input block from zero to one, averaging the new stress data of the input block in the second block size and accumulating the averaged stress data in the second block size when the input block is the edge area.

17. The method of claim 15, wherein further comprising:

reading accumulated stress data of the input block of the input image data;

averaging new stress data of the input block in a third block size smaller than the second block size and accumulate averaged stress data in the third block size when an index value of the accumulated stress data of the input block is two;

determining whether the input block is a first edge area based on a difference between the accumulated stress data of the input block and accumulated stress data of the adjacent block adjacent to the input block when the index value of the accumulated stress data of the input block is one;

averaging the new stress data of the input block in the second block size and accumulating averaged stress data in the second block size when the index value of the accumulated stress data of the input block is one and the input block is not the first edge area; and changing the index value of the accumulated stress data of the input block from one to two, average the new stress data of the input block in the third block size and accumulating the averaged stress data in the third block size when the index value of the accumulated stress data of the input block is one and the input block is the first edge area.

18. The method of claim 17, wherein further comprising determining whether the input block is a second edge area based on the difference between the accumulated stress data of the input block and the accumulated stress data of the adjacent block adjacent to the input block when the index value of the accumulated stress data of the input block is zero;

averaging the new stress data of the input block in the first block size and accumulating averaged stress data in the first block size when the index value of the accumulated stress data of the input block is zero and the input block is not the second edge area; and changing the index value of the accumulated stress data of the input block from zero to one, averaging new stress data of the input block in the second block size and accumulating the averaged stress data in the second block size when the index value of the accumulated stress data of the input block is zero and the input block is the second edge area.

* * * * *